J. G. STOWE.
Horseshoe Machine.

No. 103,681.

Patented May 31, 1870.

Witnesses:

Inventor:

UNITED STATES PATENT OFFICE.

JAMES G. STOWE, OF PROVIDENCE, RHODE ISLAND.

IMPROVED MACHINE FOR MAKING HORSESHOES.

Specification forming part of Letters Patent No. 103,681, dated May 31, 1870.

*To all whom it may concern:*

Be it known that I, JAMES G. STOWE, of Providence, in the county of Providence and State of Rhode Island, have invented an Improved Horseshoe-Machine; and do hereby declare that the following is a full and exact description, reference being had to the accompanying drawing, making a part of this specification.

The nature of my invention consists, principally, in the employment or use of an endless chain of die-blocks in a machine used for the manufacture of horseshoes or other similar articles, whereby they can be made with great rapidity and economy.

To enable those skilled in the art to make and use my invention, I will proceed to describe its construction and operation.

Figure 1:
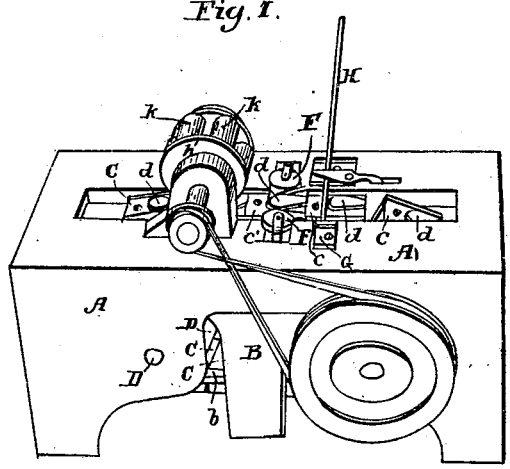
Figure 2:
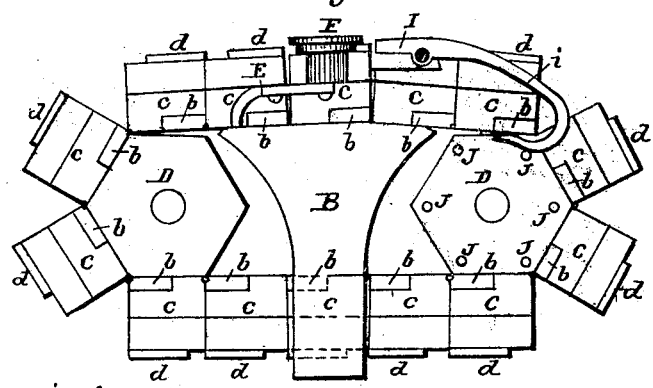
Figure 3:
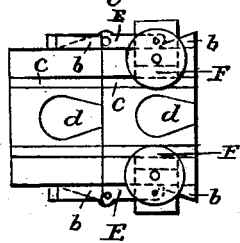
Figure 4:
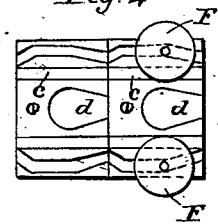

Figure 1 represents a perspective view of the machine. Fig. 2 represents a side view of the chain of die-blocks. Figs. 3 and 4 are top views of die-blocks, showing different devices for operating the forming-rolls around the die.

A is the exterior frame-work of the machine, to which is attached the anvil-block B. The endless chain of die-blocks C C C passes over the anvil and around the angular rolls D D, or their equivalent. These blocks may be connected to each other by any suitable hinge or other joint, so as to conform readily to the curve of the rolls D D, and are each to carry a die, *d*, of the required horseshoe form, which may rest in a groove of the die-block, and may be secured to the same by means of screws or bolts.

Upon the sides of the die-blocks I place the inclined cams *b b*, as shown in Fig. 3, which operate by means of the levers E E to force the forming-rolls F F toward the opposite sides of the die as it moves along, thus properly bending the iron to form the shoe.

Instead of the inclined cams and levers for operating the forming-rolls F F, the slotted die-blocks shown in Fig. 4 may be used. The shafts of the rolls passing down into the curved grooves will cause them to be forced back and forth upon the dies, as required.

The adjustable gage G is used to gage the length for cutting the shoe-blanks from the bar H, which is to have been previously creased by rolling.

The shears I, for cutting off the blanks, are placed directly opposite the gage G, and are also made adjustable, in order to cut off the blanks in such a manner as to leave them equally extended upon opposite sides of the moving dies.

The shears may be operated by means of pins J J J, placed upon the side or end of the roll D, or by any equivalent revolving cam, acting upon the lever *i* of the shears I, so as to open and close them at the proper time.

K is the common rotary hammer, to be driven by a belt or by suitable gearing, and used to hammer the shoes after they are formed around the dies.

The rolls *k k k*, striking the shoes in rapid succession, draw them and condense the material, as required to produce a shoe having a superior lasting quality. The die-blocks are firmly supported under the action of the hammer by the stationary anvil B.

The operation of the machine is as follows: The heated bar H, which has been previously creased, is passed between the shears I until it strikes the gage G, when, by the action of one of the pins J J, or of the cams previously mentioned, the shears are closed, cutting off a blank of the proper length. Then the forward motion of the die carries this blank against the forming-rolls F F, partially bending it in the required shape; and as the die passes along the action of the cam or cam-groove on the die-block forces the rolls F F to close upon the die, thus bending the iron in the proper shape to complete the shoe. The die-block passing on, the rolls F F separate, in order to receive the succeeding blank, when the same operation will be repeated. The shoe passes from the rolls F F to the revolving hammer K, where it is drawn down to the proper thickness and width, and as it passes over the roll D it falls upon an endless apron, and is conveyed away from the machine to any suitable point.

What I claim as my invention, and desire to secure by Letters Patent, is—

1. The combination of the endless chain of die-blocks C and dies *d* with mechanism to co-operate therewith to bend the bar and to impart to it the form of the dies, substantially as described.

2. The revolving endless chain of die-blocks C and dies $d$, in combination with a rotary hammer, K, and stationary anvil B, substantially as described.

3. The revolving endless chain of die-blocks C and dies $d$, in combination with the rotary hammer K, formers F, and stationary anvil B, substantially as described, and for the purpose set forth.

J. G. STOWE.

Witnesses:
 CHARLES SELDEN,
 S. SCHOLFIELD.